Figure 1:
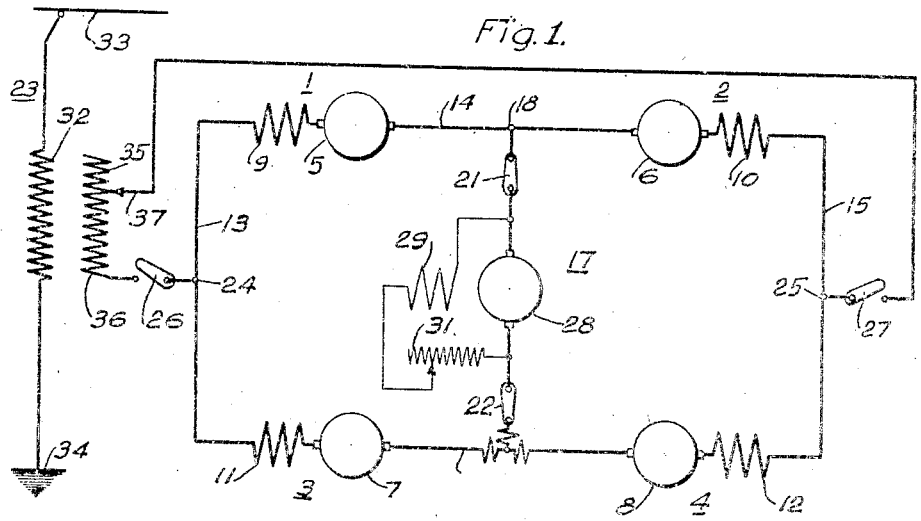

Oct. 8, 1929.  S. G. NOTTAGE  1,730,861
METHOD AND MEANS FOR OPERATING ELECTRIC MOTORS
Filed April 23, 1926

WITNESSES:
E. A. McCloskey
F. E. Hardy

INVENTOR
Stanley G. Nottage
BY
ATTORNEY

Patented Oct. 8, 1929

1,730,861

UNITED STATES PATENT OFFICE

STANLEY G. NOTTAGE, OF MURRAYSVILLE, PENNSYLVANIA, ASSIGNOR TO WESTINGHOUSE ELECTRIC & MANUFACTURING COMPANY, A CORPORATION OF PENNSYLVANIA

METHOD AND MEANS FOR OPERATING ELECTRIC MOTORS

Application filed April 28, 1926. Serial No. 104,092.

My invention relates to a method of, and means for, operating a plurality of electric motors, and it is particularly applicable to the operation of a plurality of series-wound motors of the commutator type.

In railway service, alternating-current motors of the series-wound commutator type are commonly employed because of their characteristic of developing a large starting torque, which is necessary in this class of service. Motors of this type do not commutate well when starting from a source of alternating current. This is because an induced electromotive force is produced in that portion of the armature winding between two consecutive commutator segments, while it is short-circuited by the brushes. This induced electromotive force cannot be readily compensated for at starting.

An object of my invention is to provide a method of, and means for, operating such series-wound commutator type motors whereby they may develop a large starting torque with good commutation.

In practicing my invention, I employ motors that may be operated either from direct current or from alternating current, such, for example, as series motors of the commutator type.

I operate such a motor by initially supplying direct current to it for starting, and by applying both direct current and alternating current during a portion, at least, of its acceleration. A motor of the series type starts under such conditions as a direct current motor and produces a large starting torque without difficulty in commutation. After the motor is started, it will operate satisfactorily by applying both direct current and alternating current during the acceleration period.

In practicing my invention, I also employ a novel arrangement of motor circuits. A plurality of motors are connected in parallel-circuit relation and to a source of direct current for initially starting the motors as direct-current motors. Thereafter, a source of alternating current is connected to substantially equipotential points of said circuits with reference to the direct-current source, the direct-current source being connected to substantially equipotential points of the circuits with reference to the alternating-current source.

In operating a plurality of motors connected in parallel-circuit relation as above described, it may happen that the points chosen as equipotential points with respect to the direct-current and alternating-current circuits vary slightly from the true equipotential points on account of different counter-electromotive forces of the several machines, and also on account of dissimilar characteristics of the magnetic circuits of the machines during the two half cycles of the alternating-current wave. To overcome this objection, I propose to connect an equalizing transformer in the circuit, at the junction of the connection to the source of alternating current and the loop circuit through the motors, thus preventing the alternating current from flowing through the direct-current source.

Another object of my invention is, therefore, to provide means for equalizing the voltage drop through the several portions of the parallel circuits and for preventing the flow of alternating current through the direct-current source.

My invention will be better understood by reference to the accompanying drawing in which, Fig. 1 is a diagrammatic view of circuits and apparatus, including an equalizing transformer, embodying the principles of my invention, showing the circuits as they exist at starting.

Figure 2:
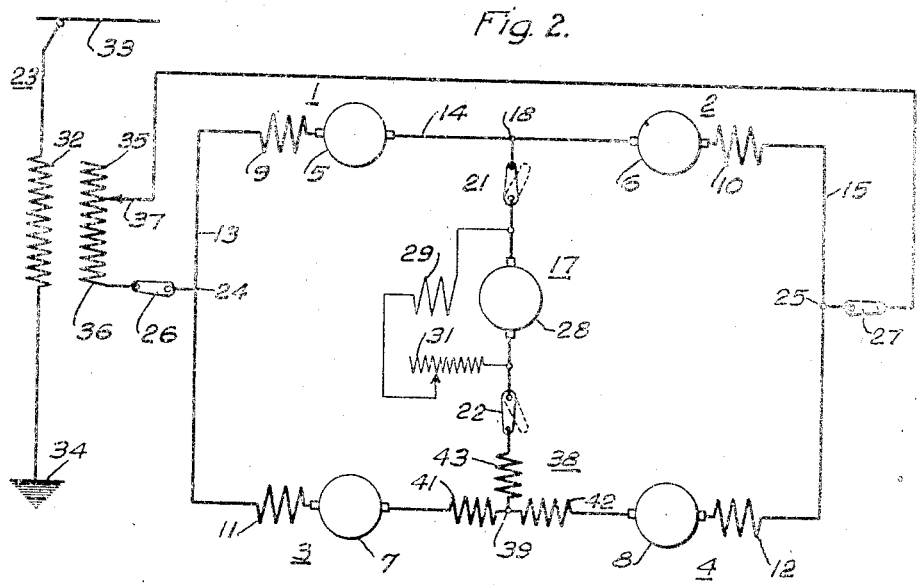
Figure 3:
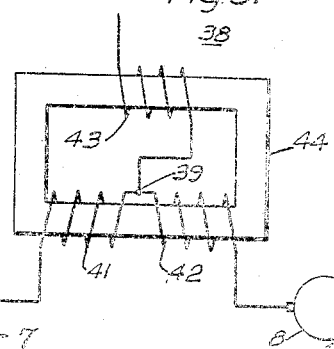

Fig. 2 is a view of a similar system, with the circuits as they exist during the accelerating and running operations of the motors; and Fig. 3 illustrates a detail of the windings of the equalizing transformer illustrated schematically in Figs. 1 and 2.

Referring to Fig. 1 of the drawing, a plurality of motors 1, 2, 3 and 4 are provided, each having commutator-type armature windings 5, 6, 7 and 8 and series wound field windings 9, 10, 11 and 12. The motors 1, 2, 3 and 4 are connected in a loop circuit by means of conductors 13, 14, 15 and 16. A source of direct-current power, such as a generator 17, is connected to the motor circuits at midpoints 18 and 19, thus forming two substantially similar loop circuits through the motors 1 and 3, and the motors 2 and 4, respectively. The generator 17 may be connected to or disconnected from, the motor circuits by means of switches 21 and 22. A source of alternating-current power, such as a transformer 23, may be connected to the motor circuits at points 24 and 25 (respectively intermediate motors 1 and 3, and motors 2 and 4) by means of switches 26 and 27.

The direct-current generator 17 comprises an armature winding 28, a shunt field winding 29, and an adjustable rheostat 31 for varying the energization of the field winding to control the voltage of the generator.

The alternating-current source of supply comprises the transformer 23 having a primary winding 32 that is connected between a trolley wire 33 and ground 34, and a secondary winding 35 that is connected by means of conductors 36 and 37, through switches 26 and 27, respectively, to the points 24 and 25 of the motor circuit. As illustrated, the secondary winding 35 of the transformer 23 is provided with a series of taps, for producing a variation of the applied alternating-current voltage by varying the point of connection of the conductor 37 to the winding 35.

When it is desired to start the motors, the switches 21 and 22 are first closed, thus connecting the several motors to the direct-current generator 17, as illustrated in Fig. 1. After the motors have been suitably started, the switches 26 and 27 are closed and alternating-current is applied, the circuit arrangement being illustrated in Fig. 2. The field rheostat 31 of the direct-current generator 17 may then be adjusted to increase the voltage of the direct-current that is applied to the motors. The point of connection of the conductor 37 to the secondary winding 35 of the alternating-current transformer 23 may also be varied to increase the voltage of the alternating current that is applied to the motors. After the direct current voltage has been increased to a given value, the motors may be accelerated by control of the alternating current voltage, preferably without any further increase in the direct current voltage. When the motors have accelerated sufficiently, the switches 21 and 22 are opened, the switches 21 and 22, in their open positions, being illustrated by broken lines the circuits of the system corresponding to the arrangement illustrated in Fig. 2 of the drawing. The motor speed may now be controlled entirely by varying the alternating current voltage from the source 23.

It will be noted that the arrangement of the motor circuits is that of a Wheatstone bridge, the direct-current source 17 being connected across it diagonally, that is, to the points 18 and 19, and the alternating current source 23 being connected to the alternate diagonal points, that is, to points 24 and 25. Direct current from the source 17 will, therefore, flow through the loop circuit comprising motors 1 and 3 and through the loop circuit comprising motors 2 and 4, the two-loop circuits being connected in parallel relation to each other. Current from the alternating current source 23 will flow through the two parallel circuits comprising motors 1 and 2, and motors 3 and 4, respectively. It will also be apparent that points 18 and 19 are substantially equipotential points with respect to the alternating-current circuits and that points 24 and 25 are substantially equipotential points with respect to the direct-current circuits.

Should the voltage drops of the alternating-current circuits be somewhat unequal, so that the points 18 and 19 are not exact equipotential points, the alternating current will tend to flow through the direct-current generator 17. To prevent or oppose such current flow, an equalizing transformer 38 illustrated in Fig. 3 is provided. The equalizing transformer 38 is provided with three windings 41, 42 and 43, upon a magnetizable core 44. The windings 41 and 42, which are differentially related and have an equal number of turns located on each side of the mid-point 19, are so connected that the alternating current through the motors 3 and 4 traverses these windings in a direction such that the fluxes produced thereby act to neutralize each other. The winding 43 may be connected to the generator armature 28 through the switch 22 and to the mid-point 19 located between the windings 41 and 42. Winding 43 comprises a number of turns that is equal to the number of turns of each of the windings 41 and 42. Since the direction of direct current flowing in the coil 41 is opposite to that flowing in the coil 42, and since these two coils are differentially wound, the fluxes produced by these two coils, by the flow of direct current, will be cumulative and will be opposite to, and neutralized by, the flux produced in the coil 43. In other words, the ampere-turns of coil 43 are equal to the ampere-turns of coils 41 and 42 combined, since all three coils have the same number of turns and the current of coil 43 is the sum of the currents of the coils 41 and 42.

When the alternating current flowing through the motors 3 and 4 passes through the windings 41 and 42 of the equalizing transformer without passing through the coil 43, the system is in a condition of balance. Should, however, a portion of the alternating current pass through the coil 43 and the generator 17, the coil 43 would produce a flux that is unneutralized by the flux created by current in the coils 41 and 42, and the alternating-current fluxes in the coils 41 and 42 would become unequal, thereby failing to neutralize each other. The effect of this unbalanced condition of the windings 41 and 42 would be to produce a counter-electromotive force in the winding 43 that opposes the passage of alternating current through the winding and the direct-current generator 17.

Various modifications may be made in the circuits and apparatus disclosed in this application without departing from the spirit of my invention, and I do not wish to be limited other than by the scope of the appended claims.

I claim as my invention:

1. In combination, a source of alternating current, a source of direct current, a plurality of series commutator motors connected in parallel circuits, means for connecting said source of direct current to said motors, means for connecting said source of alternating current to said motors at substantially equipotential points of said circuits with reference to the direct current source, said direct current source being connected at substantially equipotential points of said circuits with reference to the alternating current source, and means for equalizing the potential drop through the circuits included between said several equipotential points to oppose the flow of alternating current to said direct current source.

2. In combination, a source of alternating current, a source of direct current, a plurality of series commutator motors connected in parallel circuits, means for connecting said source of direct current to said motors, means for connecting said source of alternating current to said motors at substantially equipotential points of said circuits with reference to the direct current source, said direct current source being connected at substantially equipotential points of said circuits with reference to the alternating current source, and means for equalizing the potential drop between said several points comprising a magnetizable core, two differentially related coils wound upon said core and connected in series circuit relation between two of said motors, and a third coil wound upon said core and connected in series circuit relation with said source of direct current.

3. In combination, a source of alternating current, a source of direct current, a plurality of series commutator motors interconnected and arranged as a Wheatstone bridge, one motor being connected in each of the respective branches constituting said bridge, means for connecting said source of direct current across one diagonal of the Wheatstone bridge to start said motors, means for connecting said source of alternating current across the other diagonal of said Wheatstone bridge, and means for equalizing the potential drop through the circuits included between the several diagonal points to thereby oppose the flow of alternating current through said direct current source.

In testimony whereof, I have hereunto subscribed my name this 14th day of April, 1926.

STANLEY G. NOTTAGE.